US012679096B2

(12) United States Patent
Iwahashi et al.

(10) Patent No.: US 12,679,096 B2
(45) Date of Patent: Jul. 14, 2026

(54) LIQUID DISCHARGE APPARATUS AND CLEANING METHOD THAT REMOVE AN ADHERED SUBSTANCE FROM AN ELECTRODE IN FIRST AND SECOND OPERATIONS

(71) Applicant: CANON KABUSHIKI KAISHA, Tokyo (JP)

(72) Inventors: Shinya Iwahashi, Kanagawa (JP); Yuzuru Ishida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/525,049

(22) Filed: Nov. 30, 2023

(65) Prior Publication Data

US 2024/0208216 A1 Jun. 27, 2024

(30) Foreign Application Priority Data

Dec. 26, 2022 (JP) ................................ 2022-208392

(51) Int. Cl.
*B41J 2/165* (2006.01)
*B41J 2/14* (2006.01)

(52) U.S. Cl.
CPC ....... *B41J 2/16517* (2013.01); *B41J 2/14072* (2013.01); *B41J 2002/16564* (2013.01); *B41J 2202/12* (2013.01)

(58) Field of Classification Search
CPC ................ B41J 2/16517; B41J 2/14072; B41J 2002/16564; B41J 2202/12; B41J 2/0458; B41J 2/14129
See application file for complete search history.

(56) References Cited

U.S. PATENT DOCUMENTS

2007/0146428 A1* 6/2007 Sakai .................. B41J 2/16517 347/50
2022/0080730 A1 3/2022 Misumi et al. ............ B41J 2/14
2022/0088934 A1 3/2022 Kasai et al. ............... B41J 2/17

FOREIGN PATENT DOCUMENTS

JP 2008-105364 5/2008

* cited by examiner

*Primary Examiner* — Justin Seo
(74) *Attorney, Agent, or Firm* — Venable LLP

(57) ABSTRACT

A liquid discharge apparatus including a liquid chamber for a liquid, a liquid discharge unit including a heat-generating resistor imparting discharge energy to the liquid, first and second electrodes in the chamber, a first voltage application unit for applying a voltage to the heat-generating resistor, a second voltage application unit for applying a voltage between the first and second electrodes, and a controller controlling the voltage application units. The controller performs, to remove a substance on the first electrode, a first voltage application by the second voltage application unit between the first and second electrodes, in a first voltage application where the first electrode is an anode and a second voltage application where the first electrode is a cathode are alternatingly repeated, to partially dislodge the substance, and a second voltage application by the first voltage application unit to the heat-generating resistor, to remove the substance from the first electrode.

18 Claims, 15 Drawing Sheets

LIQUID DISCHARGE APPARATUS AND CLEANING METHOD THAT REMOVE AN ADHERED SUBSTANCE FROM AN ELECTRODE IN FIRST AND SECOND OPERATIONS

CROSS REFERENCE TO PRIORITY APPLICATION

This application claims the benefit of Japanese Patent Application No. 2022-208392, filed on Dec. 26, 2022, which is hereby incorporated by reference herein in its entirety.

BACKGROUND OF THE INVENTION

Field of the Invention

The present disclosure relates to a cleaning method of a liquid discharging head that discharges a liquid, and to a liquid discharge apparatus.

Description of the Related Art

Nowadays, a liquid discharge apparatus that uses a system is widely adopted in which electricity is applied to a heat-generating resistor to heat a liquid inside a liquid chamber and to cause film boiling of the liquid, thereby discharging a liquid droplet from a discharge orifice under the bubbling energy at this time. In such a liquid discharge apparatus, a protective layer formed of a metal material, or the like, is disposed covering the heat-generating resistor. At a thermal action portion, which is a part of the protective layer over the heat-generating resistor, and which comes into contact with the liquid, a phenomenon occurs in which color materials, additives, and so forth that are contained in the liquid, are decomposed at a molecular level due to being heated to a high temperature, and converted into substances that are not readily dissolved, and moreover, physically adsorbed onto the thermal action portion. This phenomenon is called "scorching". Such adsorption of organic or inorganic substances that are not readily dissolved, onto the thermal action portion of the protective layer, leads to uneven thermal conductivity from the thermal action portion to the liquid, and bubbling becomes unstable.

As measures to counter such scorching, Japanese Patent Application Publication No. 2008-105364 discloses a method of removing scorching, by causing elution into the liquid at a surface of a covering portion, which is made of iridium (Ir) or ruthenium (Ru), by electrochemical reaction. Specifically, a scorch-removal cleaning method is disclosed, which is carried out under application of voltage of 10 V to an upper protective layer in order to cause elution of the upper protective layer by electrochemical reaction, while performing ink suction that is started before application of the voltage.

SUMMARY OF THE INVENTION

However, with the above technique, the voltage applied to the upper protective layer for scorch-removal cleaning is a high voltage. Accordingly, in a case in which a great number of heat-generating resistors are disposed in high density, due to advances in miniaturization, a great amount of waste ink is produced in order to continue suctioning bubbles. Also, an extremely great number of air bubbles are generated on surfaces of the upper protective layer and a counter electrode due to the electrochemical reaction, and accordingly it is likely that not all of the bubbles can be removed, even with concurrent ink suctioning. Accordingly, in some cases, there is a concern that there will be some portions at which the ink, and the upper protective layer and counter electrode, become isolated from each other due to the bubbles, which will stop the electrochemical reaction, and impede scorch removal, and in such cases there is a likelihood that stable scorch-removal cleaning cannot be carried out.

It is an object of the present disclose to provide technology that enables more stable scorch-removal cleaning to be carried out.

In order to achieve the above object, a liquid discharge apparatus according to the present disclosure includes a liquid chamber that has a discharge orifice for a liquid, a liquid discharge unit including a heat-generating resistor for imparting discharge energy to a liquid in the liquid chamber, a first electrode that is provided in the liquid chamber so as to cover the heat-generating resistor, and a second electrode that is provided at a different position from the first electrode in the liquid chamber, a first voltage application unit capable of applying voltage to the heat-generating resistor, a second voltage application unit capable of applying voltage between the first electrode and the second electrode, and a control portion that controls the first voltage application unit and the second voltage application unit, wherein the control portion performs, as operations to remove an adhered substance on the first electrode, a first operation which is voltage application between the first electrode and the second electrode by the second voltage application unit and in which first voltage application where the first electrode is an anode and second voltage application where the first electrode is a cathode are alternatingly repeated, and a second operation in which the first voltage application unit applies voltage to the heat-generating resistor.

In order to achieve the above object, a cleaning method according to the present disclosure a liquid chamber that has a discharge orifice for a liquid, a liquid discharge unit including a heat-generating resistor for imparting discharge energy to a liquid in the liquid chamber, a first electrode that is provided in the liquid chamber so as to cover the heat-generating resistor, and a second electrode that is provided at a different position from the first electrode in the liquid chamber, a first voltage application unit capable of applying voltage to the heat-generating resistor, and a second voltage application unit capable of applying voltage across the first electrode and the second electrode, the cleaning method comprising removing an adhered substance on the first electrode, performing a first operation which is voltage application between the first electrode and the second electrode by the second voltage application unit, and in which first voltage application where the first electrode is an anode and second voltage application where the first electrode is a cathode are alternatingly repeated, and performing a second operation in which the first voltage application unit applies voltage to the heat-generating resistor.

Further features of the present invention will become apparent from the following description of exemplary embodiments with reference to the attached drawings.

DESCRIPTION OF THE EMBODIMENTS

Figure 1:
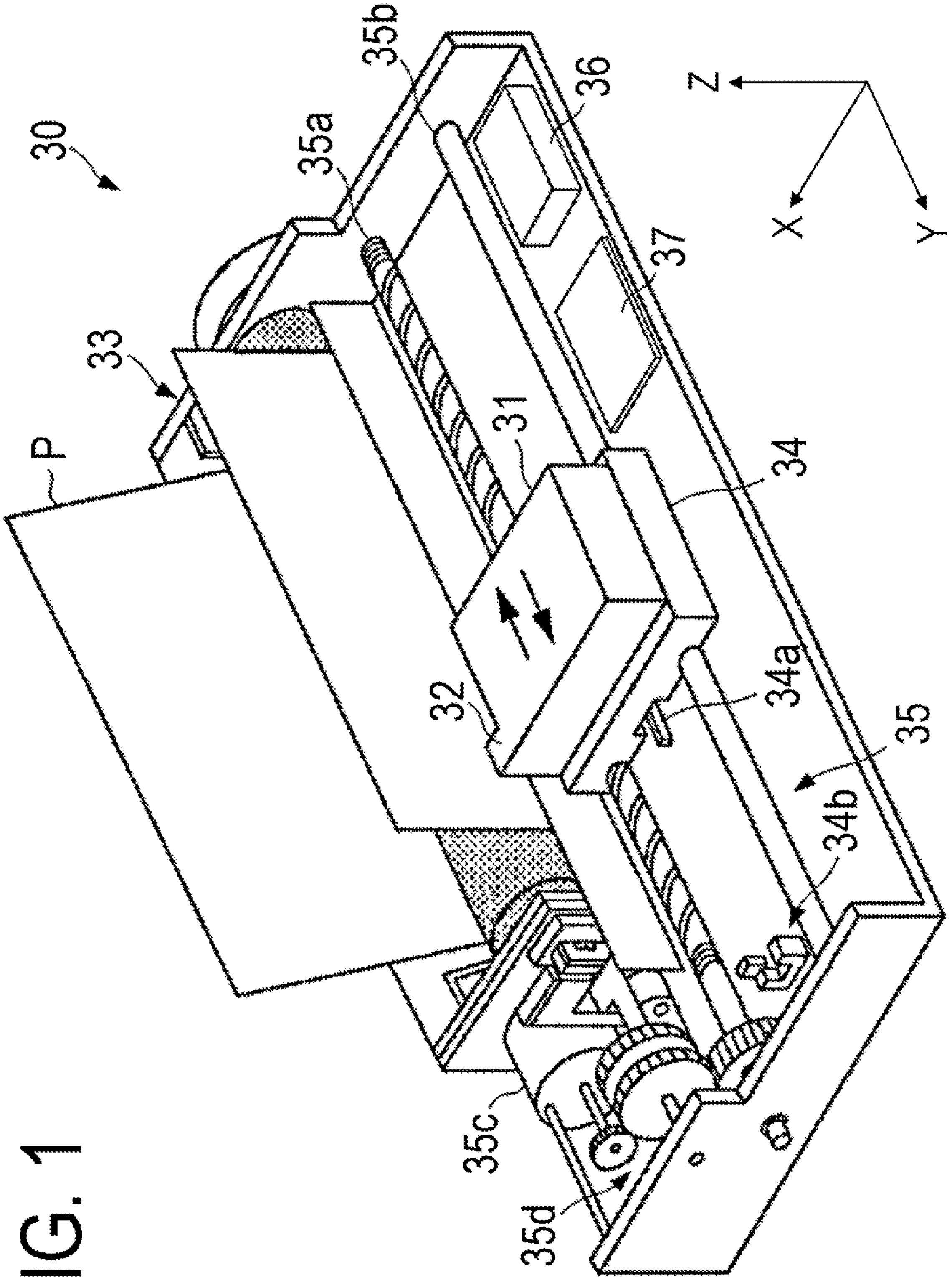
FIG. 1 is an external perspective view of a recording apparatus according to an embodiment of the present disclosure.

An embodiment will be described below in detail with reference to the attached drawings. Note that the following embodiment does not limit the invention relating to the Claims. A plurality of features are described in the embodiment, but not all of the plurality of features are essential to the invention, and the plurality of features may be optionally combined. Further, configurations in the attached drawings that are the same or similar are denoted by the same reference numerals, and redundant description will be omitted.

Description of Recording Apparatus

FIG. 1 is an external view of a recording apparatus 30 according to the embodiment of the present invention. The recording apparatus 30 is an inkjet recording apparatus serving as a liquid discharging recording apparatus (liquid discharge apparatus) that performs recording on a recording medium by discharging ink serving as a recording liquid. Note that “recording” is not limited to cases of forming meaningful information such as text, shapes, and so forth, and also broadly includes cases of forming images, designs, patterns, and so forth, whether meaningful or not, on the recording medium, or processing the medium, and regardless of whether or not manifested so as to be visually recognizable by humans. Also, although sheets of paper are assumed as the “recording medium” in the present embodiment, this may be cloth, plastic film, or the like.

Also, the recording apparatus to which the present invention is applicable is not limited to inkjet recording apparatus, and application can also be made to melting-type or sublimation thermal-transfer recording apparatus, for example. Also, the recording apparatus may be, for example, a manufacturing apparatus for manufacturing color filters, electronic devices, optical devices, microstructures, and so forth, by a predetermined recording method. Also, the recording apparatus may be a apparatus for forming three-dimensional images from 3D data.

The recording apparatus 30 includes an ink tank 31 and a recording head 32, which are an integral unit, and are mounted on a carriage 34. The recording head 32 discharges ink accommodated in the ink tank 31 onto a recording medium P to perform recording. The carriage 34 is capable of reciprocal movement in directions of arrows (Y direction) by a drive unit 35. The drive unit 35 includes a lead screw 35*a* and a guide shaft 35*b* that extend in a direction of movement of the carriage 34. The lead screw 35*a* engages a screw hole (omitted from illustration) of the carriage 34, and the carriage 34 moves by rotation thereof. A motor 35*c* and a geartrain 35*d* make up a rotation mechanism of the lead screw 35*a*. The guide shaft 35*b* guides movement of the carriage 34. An optical sensor 34*b* that detects a detected piece 34*a* of the carriage 34 is disposed at one end of a range of movement of the carriage 34, and detection results thereof are used for controlling movement of the carriage 34.

A conveying unit 33 conveys the recording medium P. The conveying unit 33 includes a motor (omitted from illustration) that is a drive source, and conveying rollers (omitted from illustration) that are rotated by drive force of the motor, and the recording medium P is conveyed by rotation of the conveying rollers.

The recording apparatus 30 includes an internal power source 36 that supplies electric power consumed in the recording apparatus 30, and a control circuit 37 that controls the recording apparatus 30. The control circuit 37 causes movement of the recording head 32 by movement of the carriage 34 and discharging of ink, and conveying of the recording medium P, to be performed alternatingly, thereby recording images on the recording medium P.

Figure 2:
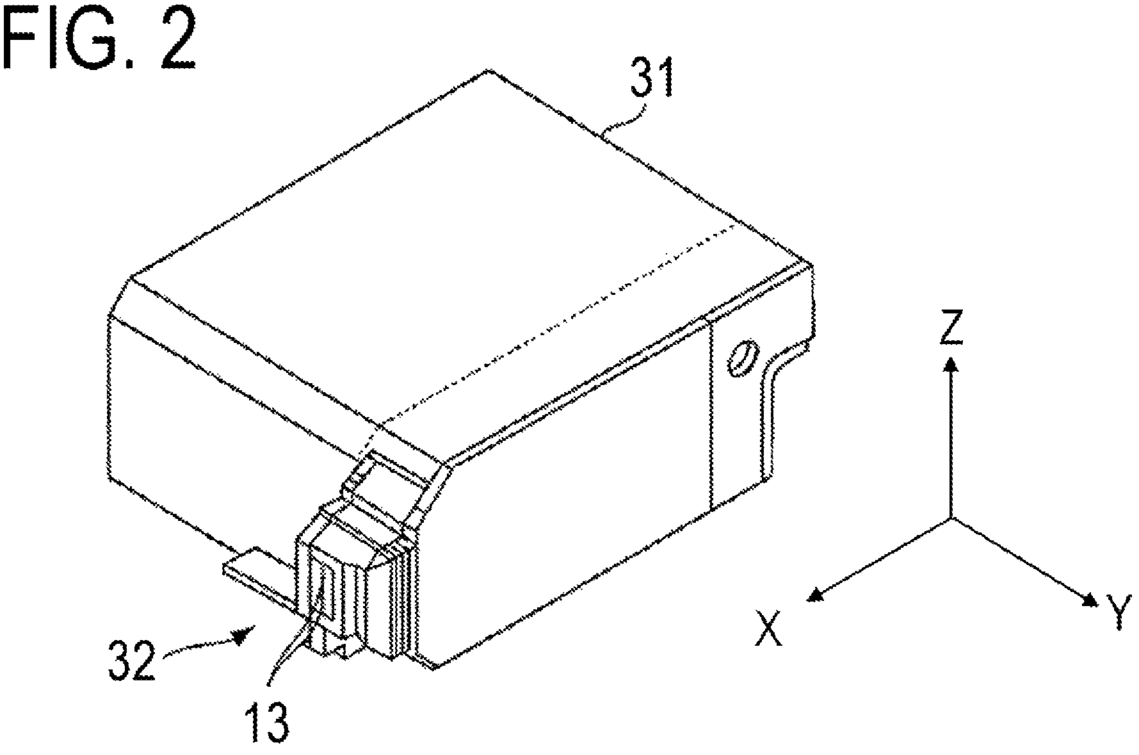
FIG. 2 is a perspective view of a vicinity of a recording head.

FIG. 2 is a perspective view of the ink tank 31 and the recording head 32 that are an integral unit. The ink tank 31 and the recording head 32 can be separated at a position indicated by the dotted line. The recording head 32 has a plurality of discharge orifices 13 that discharge ink. The recording head 32 has a recording element board 10 serving as a board for a liquid discharging head.

Recording Element Board

Figure 3:
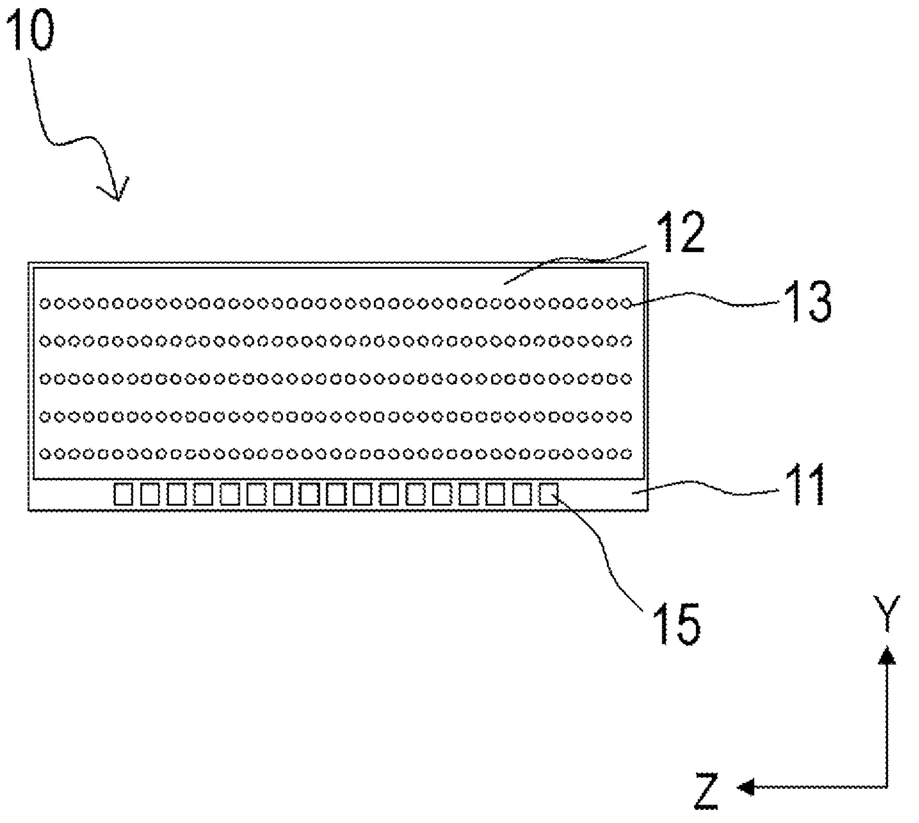
FIG. 3 is a schematic diagram of a recording element board.
Figure 4:
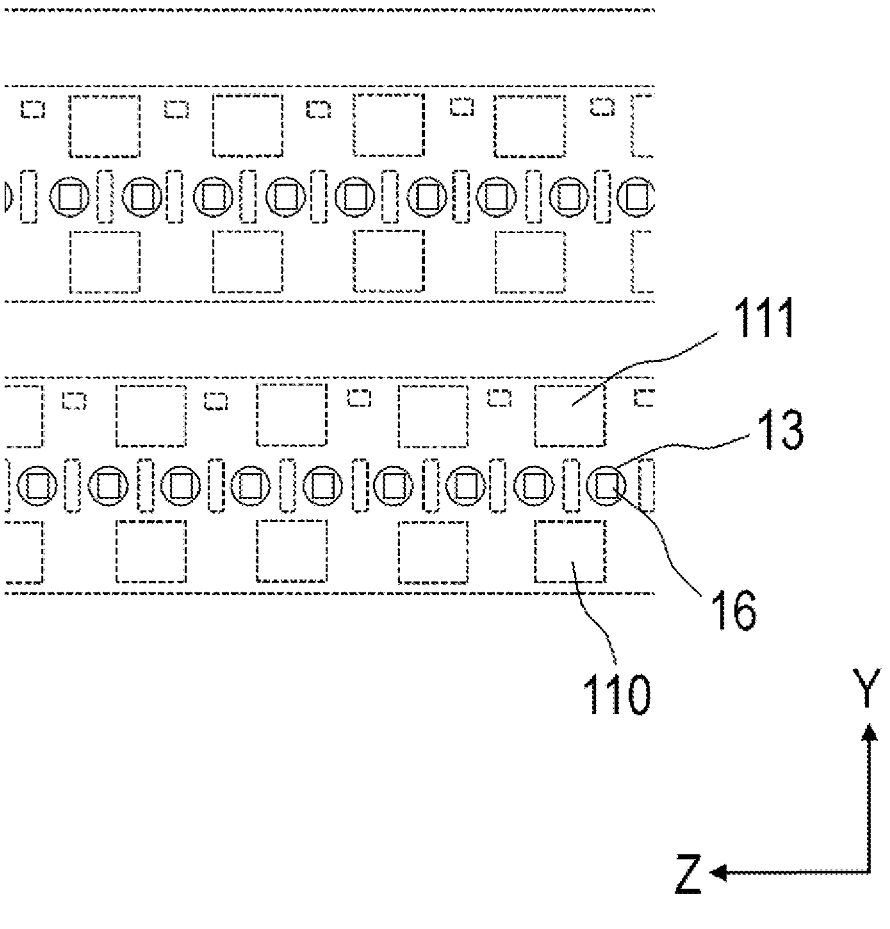
FIG. 4 is an enlarged view of the recording element board.

FIG. 3 is a schematic diagram of a face of the recording element board 10 serving as the board for the liquid discharging head, on a side thereof where the discharge orifices 13 are formed. FIG. 4 is an enlarged view of FIG. 3. The recording element board 10 includes a circuit member 11 made up of a plurality of layers laminated on a silicon substrate, and a discharge orifice formation member 12 that is made of a photosensitive resin, silicon, or the like. The plurality of discharge orifices 13 are formed in an array in the discharge orifice formation member 12 of the recording element board 10. Thermal action portions 16 for causing bubbling of the liquid by thermal energy are formed at positions corresponding to respective discharge orifices 13. Heat-generating elements are disposed within the thermal action portions 16. The heat-generating elements are electrically connected to terminals 15 by electrical wiring provided to the circuit member 11. The heat-generating elements generate heat and boils the liquid, on the basis of pulse signals input from the control circuit 37 of the recording apparatus 30 via an electrical wiring board and a flexible wiring board. The force of bubbling by this boiling is used as discharge energy, thereby discharging the liquid from the discharge orifices 13.

Figure 5A:
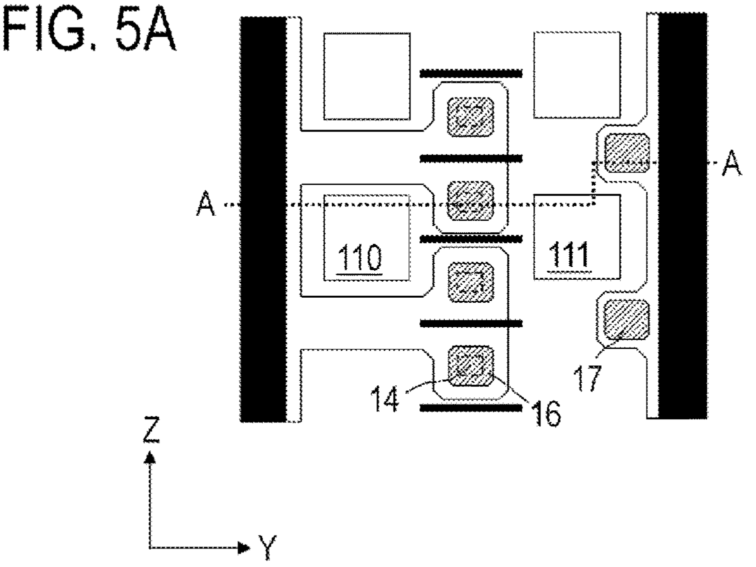
FIG. 5A is a planar view in which a vicinity of a thermal action portion of the recording element board is enlarged.
Figure 5B:
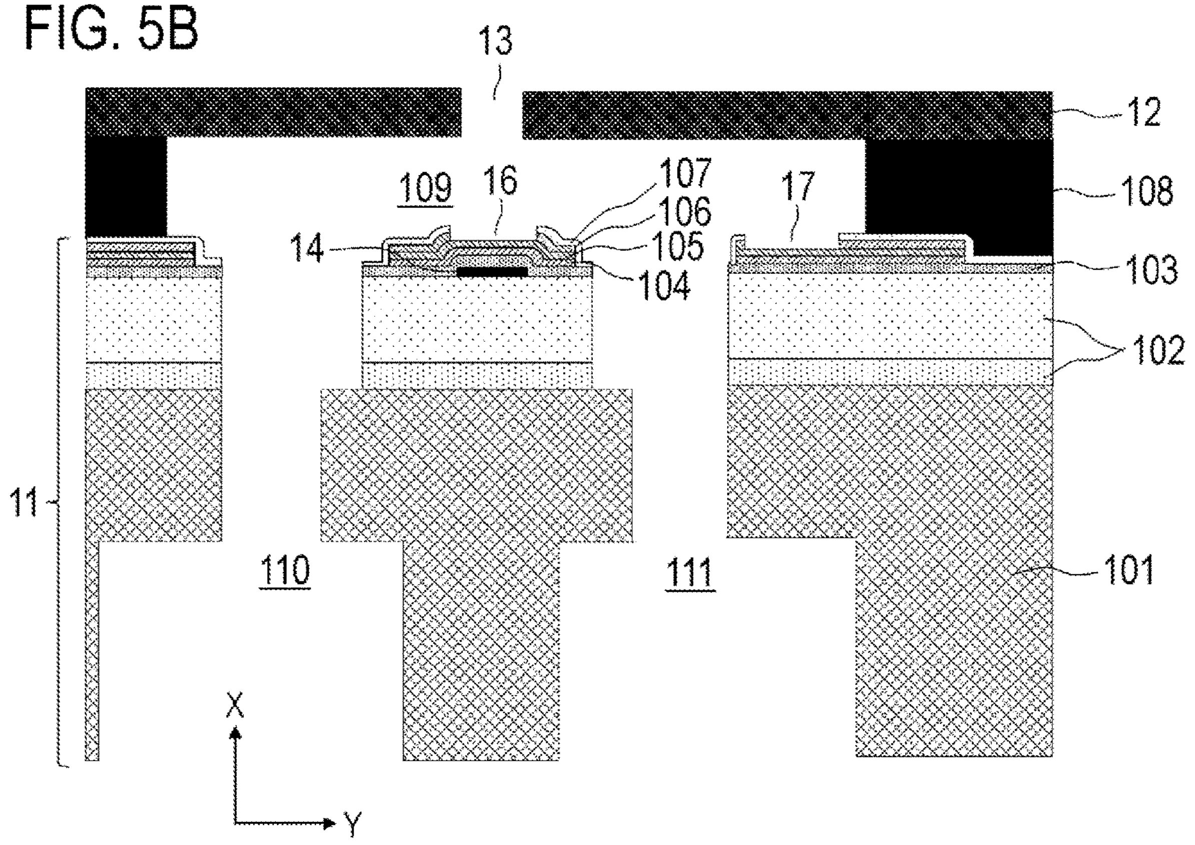
FIG. 5B is a cross-sectional view taken along A-A in FIG. 5A.

FIG. 5A is a planar view illustrating a vicinity of the thermal action portions 16 of the recording element board 10 in further detail. Note that the discharge orifice formation members 12 are omitted from illustration here. Also, FIG. 5B is a cross-sectional view taken along portion A-A in FIG. 5A. Note that the thermal action portions 16 are each a portion that comes into contact with the liquid in order to cause bubbling of the liquid, and imparts heat to the liquid.

In the present embodiment, a thermal storage layer 102 made of a thermal oxidization layer, a silicon monoxide (SiO) film, a carbon-doped silicon oxide (SiOC) film, and so forth, are disposed on a silicon substrate 101. Also, a heat-generating resistor 14 that is made of a tantalum silicon nitride (TaSiN) film, a tungsten silicon nitride (WSiN) film, or the like, is disposed on the thermal storage layer 102 as a heat-generating element. An electrical wiring layer (omitted from illustration) made of metal materials such as an aluminum (Al) film, an aluminum-silicon (AlSi) film, an aluminum-copper (AlCu) film, or the like, is connected to the heat-generating resistor 14 via a plug (omitted from illustration) made of a tungsten (W) film, or the like. A pair of plugs is disposed with respect to the heat-generating resistor 14, and a portion of the heat-generating resistor 14 through which electric current flows via the plugs functions as the heat-generating element for discharging liquid. The plugs and the electrical wiring layer are formed within the thermal storage layer 102. An insulating protective layer 103 is disposed on the heat-generating resistor 14 so as to cover the heat-generating resistor 14. The insulating protective layer 103 is made of, for example, a SiO film, a SiOC film, a silicon carbon nitride (SiCN) film, a silicon nitride (SiN) film, or the like.

Disposed on the insulating protective layer 103 are a first protective layer 104 and an upper protective layer 105 that serves as a second protective layer. These protective layers serve a role of protecting the surface of the heat-generating resistor 14 from chemical and physical impact due to heating of the heat-generating resistor 14. The first protective layer 104 is made of tantalum (Ta) and the upper protective layer 105 is made of iridium (Ir), for example. Also, the protective layers made of these materials have electrical conductivity. Note that the material making up the upper protective layer 105 may be a material containing ruthenium (Ru) or may be a material containing platinum (Pt).

Also, a first adhesion layer 106 and a second adhesion layer 107 are disposed on the upper protective layer 105. The first adhesion layer 106 serves a role of improving close contact of the upper protective layer 105 and other layers. The first adhesion layer 106 is made of tantalum (Ta), for example. The second adhesion layer 107 serves a role of protecting other layers from the liquid, and for improving close contact with a partition 108. The second adhesion layer 107 is made of SiC or SiCN, for example.

The discharge orifice formation member 12 is on a face of the circuit member 11 that is on the second adhesion layer 107 side thereof, is joined thereto through the partition 108, and together with the circuit member 11 forms a channel 109 including a pressure chamber. The channel 109 includes a supply port 110 and a recovery port 111, and is a region that is surrounded by the discharge orifice formation member 12, the partition 108, and the circuit member 11.

At the time of discharging liquid, the temperature of the liquid instantaneously rises and forms a bubble in the liquid on the thermal action portion 16 of the upper protective layer 105 that covers the heat-generating resistor 14 and that is in contact with the liquid, the bubble collapses, and cavitation occurs. Accordingly, the upper protective layer 105 including the thermal action portion 16 is made of iridium, which has high corrosion resistance and high cavitation resistance. This thermal action portion 16 of the upper protective layer 105 is situated between the supply port 110 and the recovery port 111 as viewed from a direction orthogonal to a surface of the circuit member 11. Note that the phrase “situated between the supply port 110 and the recovery port 111” means that at least part of the thermal action portion 16 is located between the supply port 110 and the recovery port 111.

Also, a counter electrode 17 that is used for later-described scorching suppression processing is disposed in the channel 109, on a downstream side of the thermal action portion 16 of the upper protective layer 105 in a direction of flow of the liquid from the supply port 110 toward the recovery port 111. In other words, the counter electrode 17 is disposed on the side of the thermal action portion 16 towards the recovery port 111. Also, as illustrated in FIG. 5A, the supply ports 110 are situated on one side with respect to the array of a plurality of the thermal action portions 16 (in a direction orthogonal to the array direction of the thermal action portions 16). Also, recovery ports 111 are disposed on the other side with respect to the array of the plurality of thermal action portions 16. In this case, the counter electrodes 17 are disposed on the recovery ports 111 side of the row of thermal action portions 16.

Description of Scorch-Removal Cleaning

With liquid discharge apparatus that cause film boiling in liquid by heating with a heat-generating resistor, and making use of the bubbling energy at this time, physical actions such as shock due to cavitation occurring at the time of the liquid bubbling, the bubble contracting, and then collapsing, may affect a region on the heat-generating resistor. Also, at the time of performing discharge of the liquid, the heat-generating resistor is at an elevated temperature, and accordingly chemical actions such as components of the liquid being subjected to thermal decomposition, and then becoming adhered, fixed, and deposited, may affect a region on the heat-generating resistor. In order to protect the heat-generating resistor from such physical actions and chemical actions, a protective layer made of a metal material, or the like, is disposed on the heat-generating resistor so as to cover the heat-generating resistor, but substances may adhere to the protective layer as described above, and such adhered substances are called “scorching”.

The liquid discharging head according to the preset embodiment includes the heat-generating resistor 14 disposed in the channel 109 that communicates with the discharge orifices 13, and the insulating protective layer 103 that shields contact between the heat-generating resistor 14 and the liquid in the channel 109. Further, the liquid discharging head includes the upper protective layer 105 having the thermal action portion 16 that covers at least the portion heated by the heat-generating resistor 14. The upper protective layer 105 is made of a material that contains a metal that is eluted by electrochemical reaction with the liquid, and also on which no oxide layer that prevents elution due to being heated is formed. A cleaning method for removing scorching that is deposited on the upper protective layer 105 in such a liquid discharging head will be described.

Figure 8:
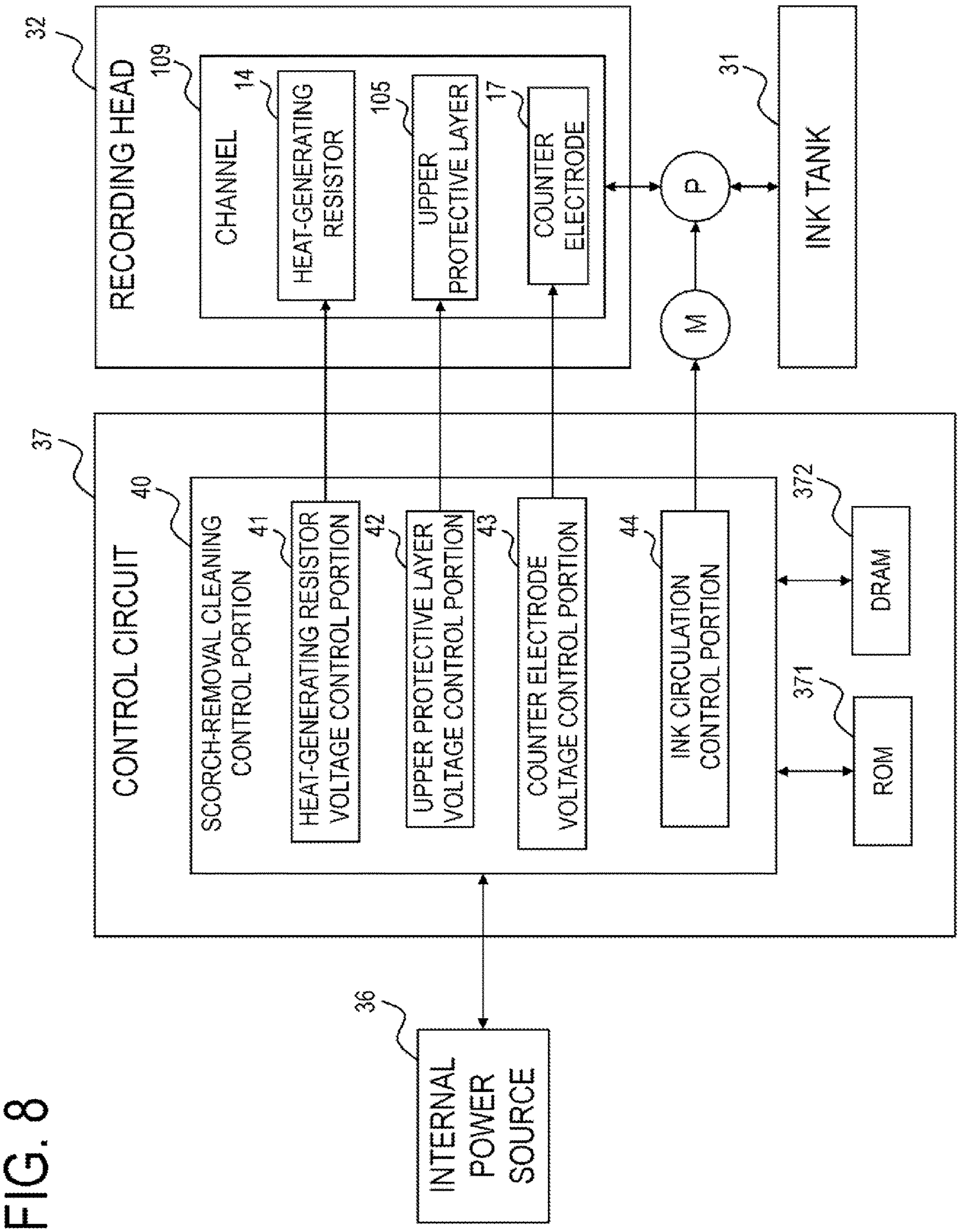
FIG. 8 is a control configuration diagram regarding scorch-removal cleaning.

FIG. 8 illustrates a control configuration for scorch-removal cleaning in the recording apparatus 30 according to the present embodiment. FIG. 8 illustrates only the control configuration relating to the scorch-removal cleaning out of the control configuration of the recording apparatus 30 according to the present embodiment. The control circuit 37 includes a scorch-removal cleaning control portion 40. The scorch-removal cleaning control portion 40 is made up of a heat-generating resistor voltage control portion 41 serving as a first voltage application unit, an upper protective layer voltage control portion 42 and a counter electrode voltage control portion 43 that serve as a second voltage application unit, an ink circulation control portion 44 serving as a liquid circulation unit, and so forth. These control portions read a control program for scorch-removal cleaning and data related thereto from read-only memory (ROM) 371 into dynamic random-access memory (DRAM) 372, and use the DRAM 372 to control the portions of the recording apparatus 30 and to execute scorch-removal cleaning. The data stored in the ROM 371 includes, for example, a magnitude of a pulse voltage that is applicable to the heat-generating resistor 14 and application time thereof, a number of times of application, and so forth, a magnitude of a voltage that is applicable to the upper protective layer 105 and counter electrode 17 and an application time thereof, a number of times of application, and so forth.

Electrochemical reaction is caused using one electrode (counter electrode) 17 in the same channel 109 as the upper protective layer 105, thereby causing elution of the upper protective layer 105 into the liquid. In order to carry out this electrochemical reaction, the upper protective layer voltage control portion 42 and the counter electrode voltage control portion 43 that serve as the second voltage application unit control application of voltage to the upper protective layer 105 and the counter electrode 17.

A voltage application process includes a first process of applying voltage with the upper protective layer 105 as an anode and the counter electrode 17 as a cathode (first voltage application), and a second process of applying voltage with the upper protective layer 105 as a cathode and the counter electrode 17 as an anode (second voltage application). In the present embodiment, the first process and the second process are repeatedly performed. Such a voltage application process causes elution of the upper protective layer 105 into the liquid due to the electrochemical reaction, thereby removing the adhered substance that is adhering to the thermal action portion 16 of the upper protective layer 105.

As described above, causing elution of the upper protective layer 105 by electrochemical reaction with the liquid in order to remove the scorching on the thermal action portion 16 of the upper protective layer 105 generates air bubbles in accordance with the reaction. The air bubbles that are generated in this way impede the above-described electrochemical reaction if they are retained on the upper protective layer 105, and thus become a factor in impeding elution of the upper protective layer 105 into the liquid. This can lead to uniform and reliable scorch removal not being able to be sufficiently performed, and accordingly, measures such as removing air bubbles by suctioning, or the like, have been conventionally undertaken.

Also, the applied voltage needs to be such that a potential necessary for causing the electrochemical reaction of the upper protective layer 105 is applied. For example, in a case of using a combination of the upper protective layer 105 made of iridium and a liquid of pH 7, at least 1 V is necessary according to a potential-pH diagram. In order to obtain an elution rate that is practical, voltage of 2 V or more is preferably applied, although this depends on the liquid being used. Also, in a case of using a liquid of which water is the principal component, the electrolysis voltage of water is around 1 V, and accordingly bubbles are generated to one extent or another.

Figure 9:
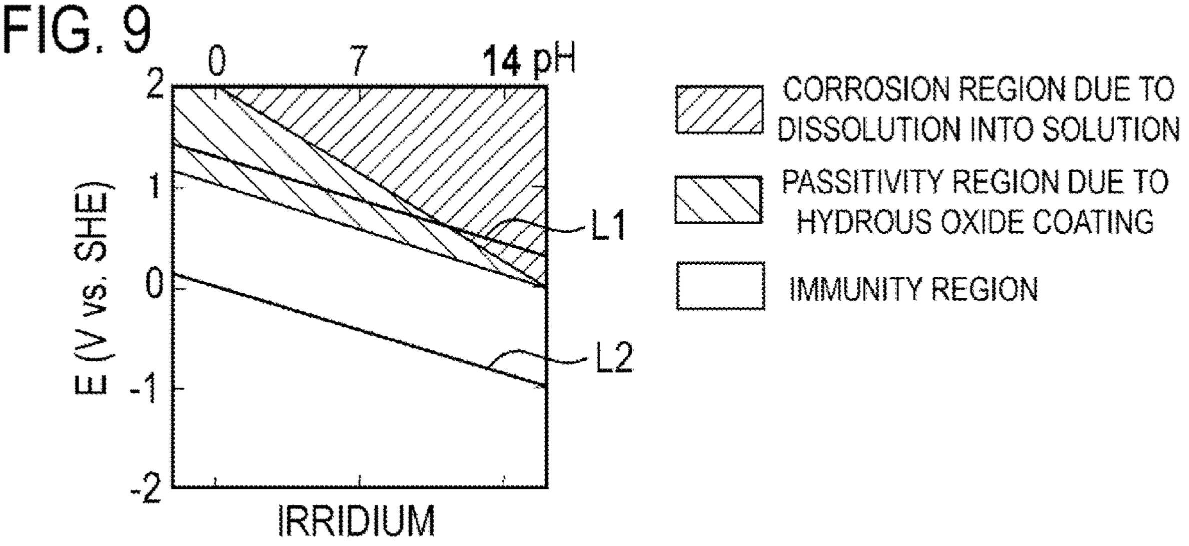
FIG. 9 is a potential-pH diagram of Ir used as a material to form the upper protective layer.

FIG. 9 is a potential-pH diagram for iridium, out of the materials containing metal that is eluted by the electrochemical reaction of the upper protective layer 105 and the ink. It can be clearly seen from FIG. 9 that there is a region at which elution occurs by applying potential with iridium as the anode electrode (corrosion region due to dissolution into solution). Note that in FIG. 9, lines L1 and L2 indicate potentials relating to generation and decomposition of water. That is to say, only in a region above the line L1 is oxygen generated, and only in a region below the line L2 is hydrogen generated. Accordingly, between the lines L1 and L2 is a stable region for water.

Mechanism of Scorch-Removal Cleaning

Figure 7A:
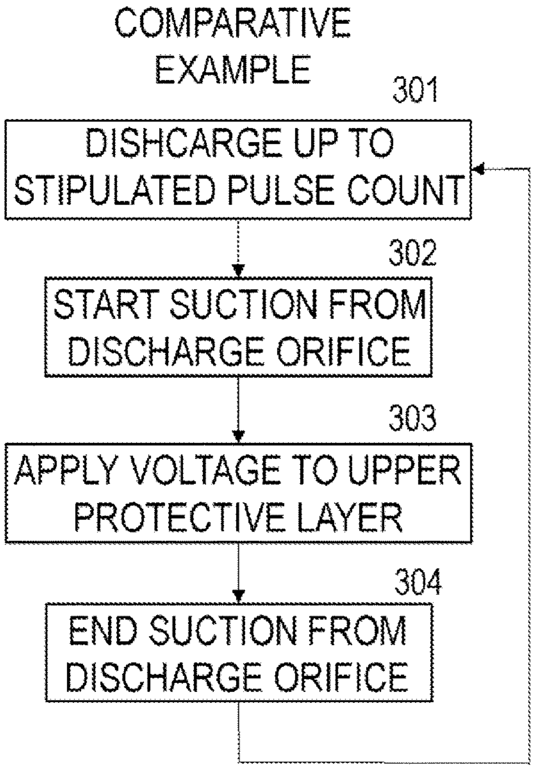
FIG. 7A is a flowchart of recording operations carried out by a liquid discharging recording apparatus according to a comparative example.

FIG. 7A shows a flow from recording operations to scorch-removal cleaning in a conventional recording apparatus as a comparative example. During recording operations, discharging is performed up to a stipulated pulse count, upon which a command for scorch-removal cleaning processing is entered (301). Suctioning from the discharge orifices is started for bubble removal (302), and also voltage is applied to the upper protective layer 105 of the recording element board 10 and potential begins to be imparted (303). Bubbles are generated by elution of the upper protective layer 105 due to electrochemical reaction thereof with the liquid, and upon scorching being removed due to the action of these bubbles, suction from the discharge orifices is stopped and scorch-removal cleaning ends.

As described above, upon voltage being applied to the upper protective layer 105 and the counter electrode 17 for scorch-removal cleaning, bubbles are generated on the surfaces of the upper protective layer 105 and the counter electrode 17 due to the electrochemical reaction with the liquid. In such a state, the liquid, and the upper protective layer 105 and counter electrode 17, are shielded from each other, by the bubbles, the electrochemical reaction stops, and scorch removal can no longer be performed. Accordingly, in the conventional art, at the time of scorch-removal cleaning processing, voltage is applied to the upper protective layer 105 while performing discharge processing of bubbles by suctioning the liquid from the discharge orifices 13, and so forth, such that the surfaces of the upper protective layer 105 and the counter electrode 17 are constantly in contact with the liquid.

Conversely, in the present embodiment, the applied voltage is suppressed so as to suppress generation of bubbles. The difference in scorch-removal mechanisms between when the applied voltage is high and when the applied voltage is low, will be described by way of schematic cross-sectional views in FIGS. 6A to 6E. In order to concisely illustrate the scorch-removal mechanisms, a description will be made here assuming that the above-described phenomenon, in which the liquid, and the upper protective layer 105 and counter electrode 17, are shielded from each other by the bubbles, and the electrochemical reaction stops, does not occur.

Figure 6A:
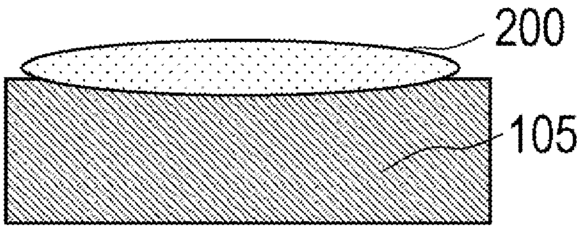
FIG. 6A is a schematic diagram illustrating a state after scorching has adhered to an upper protective layer.

FIG. 6A illustrates a state after scorching 200 adheres to the upper protective layer 105.

Figure 6B:
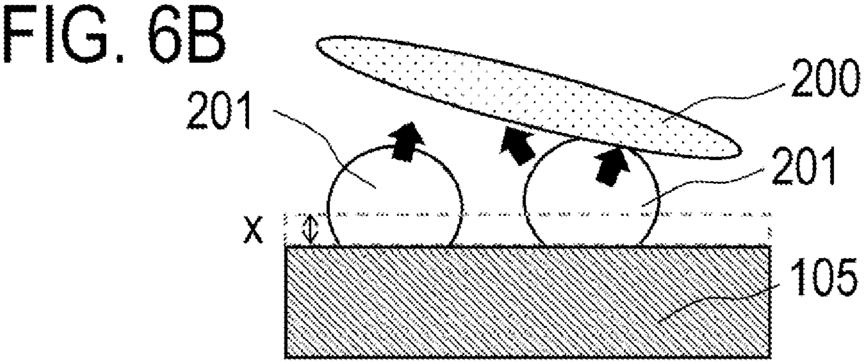
FIG. 6B is a schematic diagram for describing a state in which scorching is being removed by bubbles.

FIG. 6B illustrates a relatively high voltage, e.g., 10 V, being applied to the upper protective layer 105 in the state in FIG. 6A, and time elapsing. A state is illustrated in which, at this time, elution of the upper protective layer 105 occurs over a relatively small thickness x and the scorching 200 comes loose, and the scorching 200 is removed by energy of bubbles 201 generated by electrochemical reaction with the liquid.

Figure 6C:
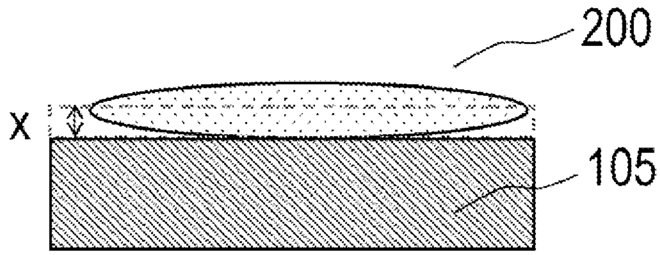
FIG. 6C is a schematic diagram for describing a state in which scorching is loose.

FIG. 6C illustrates a state in which a relatively low voltage, e.g., 3 V, is applied to the upper protective layer 105 in the state in FIG. 6A, and time elapsing. A state is illustrated in which, at the point in time at which elution of the upper protective layer 105 occurs over the same thickness x as in FIG. 6B, and the scorching 200 comes loose but is not removed as of yet. This is because, while an extremely great number of bubbles due to the electrochemical reaction are generated under application of high voltage, not many are generated here, and, moreover, energy is insufficient to remove the scorching 200.

Figure 6D:
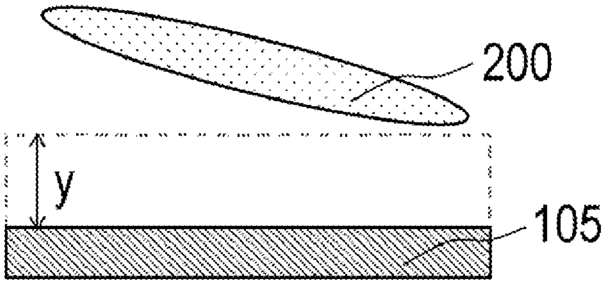
FIG. 6D is a schematic diagram illustrating a state in which scorching is removed by elution of the upper protective layer.

Thereafter, when elution of the upper protective layer 105 advances to a sufficient thickness y, the scorching 200 is removed by lifting off thereof, as illustrated in FIG. 6D.

Figure 6E:
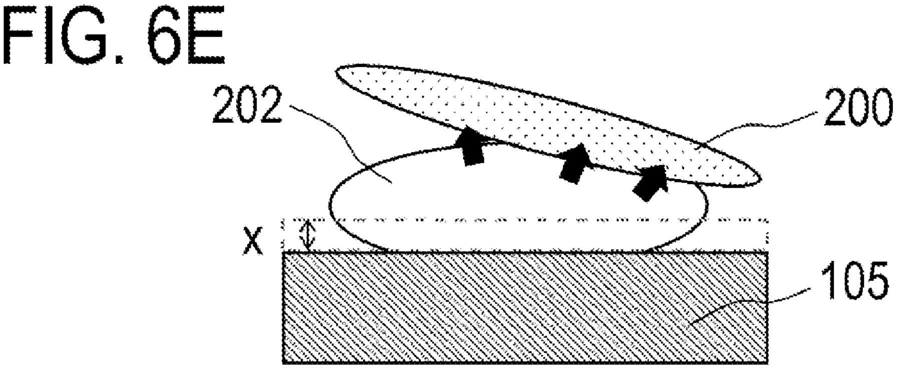
FIG. 6E is a schematic diagram illustrating a state in which scorching is removed using bubbles generated by film boiling of liquid.

Accordingly, in a case of applying a relatively low voltage, the heat-generating resistor 14 is heated with respect to scorching that is not removed at the point in time of elution of the upper protective layer 105 to the thickness x as illustrated in FIG. 6C, thereby promoting peeling away of the scorching. That is to say, the scorching is separated from the upper protective layer 105 by a bubble 202 at the time of film boiling of the liquid due to heating, or the like, of the heat-generating resistor 14 that is disposed at a lower layer from the upper protective layer 105, for example, as illustrated in FIG. 6E. Thus, the scorch-removal cleaning processing is complete. Note that, in a state in which no elution whatsoever is performed on the upper protective layer 105 to which the scorching is adhered, not even performing boiling of the liquid can remove the scorching, and accordingly boiling of the liquid is preferably performed after the upper protective layer 105 is thinly eluted.

Figure 7B:
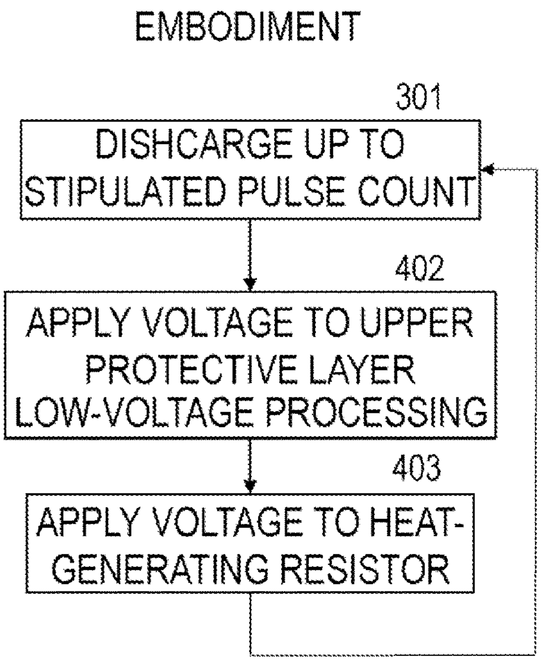
FIG. 7B is a flowchart of recording operations carried out by recording by a liquid discharging apparatus according to the embodiment.

FIG. 7B shows a flow from recording operations to scorch-removal cleaning that is carried out in the recording apparatus 30 according to the preset embodiment. Although the inkjet system will be exemplified here, this does not limit the scope, as described earlier. During recording operations, discharging is performed up to a stipulated pulse count, upon which a command for scorch-removal cleaning processing is entered (301). Voltage is applied to the upper protective layer 105 of the recording element board 10, and potential begins to be imparted (402). In the present embodiment, film boiling of the ink is performed by application of pulse voltage to the heat-generating resistor 14 before scorch removal by formation of potential between the upper protective layer 105 and the counter electrode 17 alone is completed, and the scorch-removal cleaning is completed by the physical energy of bubbles collapsing. (403). That is to say, first, a first operation of repeatedly alternating the first voltage application with the counter electrode 17, in which the upper protective layer 105 is an anode, and the second voltage application in which the upper protective layer 105 is a cathode, is performed, but this operation is not performed until the scorching is removed from the upper protective layer 105. The object of this first operation is to cause the scorching to be in a state of coming loose from the upper protective layer 105 (a state in which the area of adhesion between the scorching and the upper protective layer 105 has been reduced) to an extent that the scorching can be smoothly peeled away in a following second operation. Complete removal of the scorching is performed by the second operation in which a pulse voltage is applied to the heat-generating resistor 14. Note that, in the comparative example, scorch-removal cleaning is performed while performing suctioning from the discharge orifices for bubble removal.

Hereafter, Examples will be described along with a Comparative Example. Here, in all examples, recording element boards 10 that have discharged a pigment-based ink for inkjet use to a stipulated count (1E9 pulses), to a state in which scorching is formed on the upper protective layer 105 under the same conditions, were prepared. Also, the voltage application time to the upper protective layers 105 was set for each voltage such that applied energy (voltage×voltage×time) is equal. During the voltage application processing, ink suction from the discharge orifices 13 is not performed, and accordingly the electrochemical reaction readily stops and scorch removal is difficult, as compared to the Comparative Example that is carried out while performing suctioning.

Comparative Example 1

Figure 10:
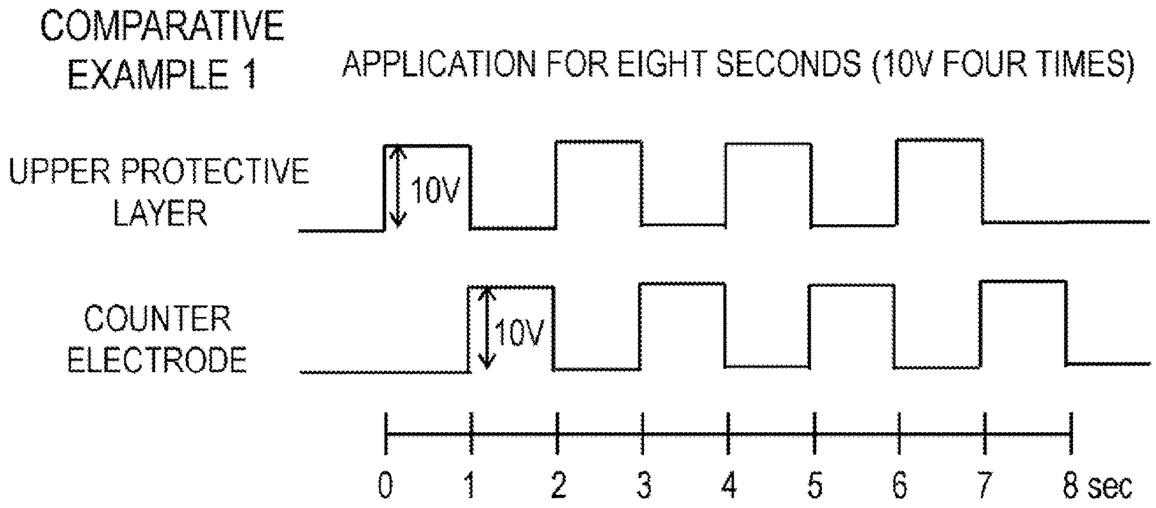
FIG. 10 is a timing chart of scorch-removal cleaning according to the comparative example.

FIG. 10 shows a timing chart for scorch-removal cleaning according to Comparative Example 1. In the scorch-removal cleaning according to Comparative Example 1, only the first operation described above was performed.

The first process of applying voltage of 10 V with the upper protective layer 105 of the recording element board 10 as an anode and the counter electrode 17 thereof as a cathode, and the second process of applying voltage of 10 V with the upper protective layer 105 as a cathode and the counter electrode 17 as an anode, were alternated once a second each, which was repeated for a total of eight seconds. Observation of the external appearance following application of voltage revealed an extremely great number of bubbles in the channel 109, and residual bubbles completely covering the upper protective layer 105 or the electrode of the counter electrode 17 were also confirmed. According to the effects thereof, scorching on the upper protective layer 105 was not removed. Note that attempts to perform discharge in this state without suctioning failed in normal discharge, due to residual bubbles.

Example 1

Figure 11:
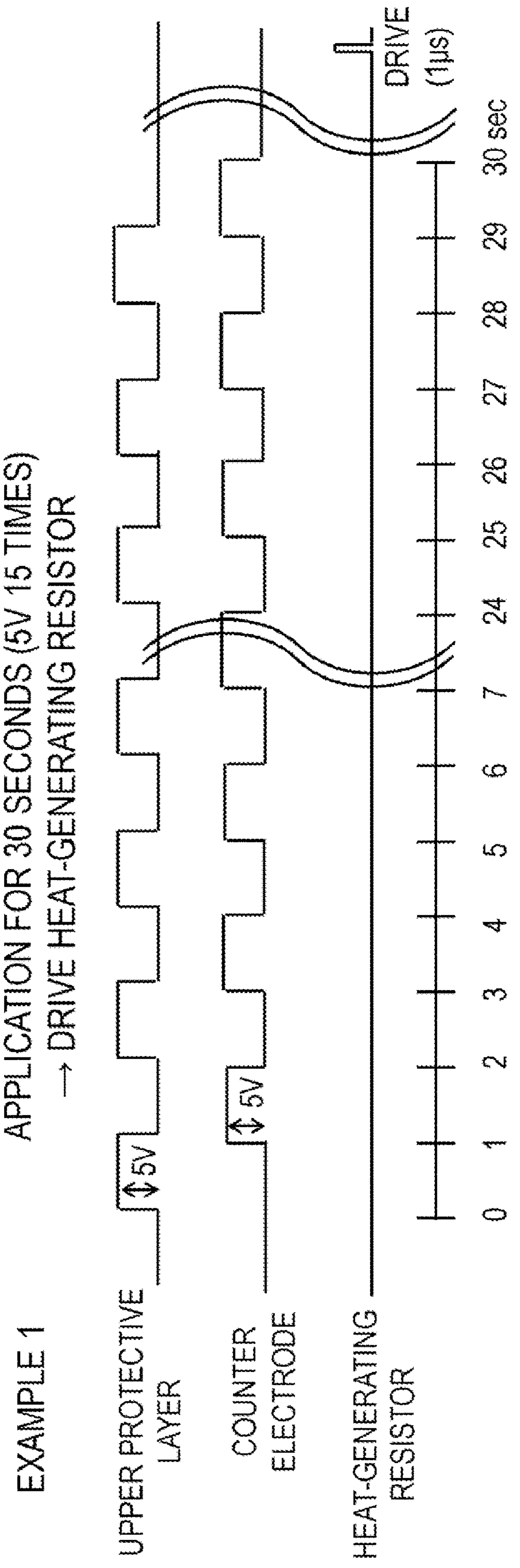
FIG. 11 is a timing chart of scorch-removal cleaning according to Example 1.

FIG. 11 shows a timing chart for scorch-removal cleaning according to Example 1. In the scorch-removal cleaning according to Example 1, after performing the first operation described above, the second operation described above was also performed. Note that, while application of pulse voltage to the heat-generating resistor 14 is shown as being performed one time in FIG. 11, an application may be performed a plurality of times, which will be described later. This holds true for the other Examples as well.

The first process of applying voltage of 5 V with the upper protective layer 105 of the recording element board 10 as an anode and the counter electrode 17 thereof as a cathode, and the second process of applying voltage of 5 V with the upper protective layer 105 as a cathode and the counter electrode 17 as an anode, were alternated once a second each, which was repeated for a total of thirty seconds. Observation of the external appearance following application of voltage revealed that scorching on the upper protective layer 105 was not removed, but only a slight amount of bubbles was present in the channel, and there was no presence of residual bubbles completely covering the upper protective layer 105 or the electrode of the counter electrode 17. It was found that by applying pulse voltage several times to the heat-generating resistor 14 in this recording element board 10, scorching on the upper protective layer 105 could be removed by discharging ink several times.

Example 2

Figure 12:
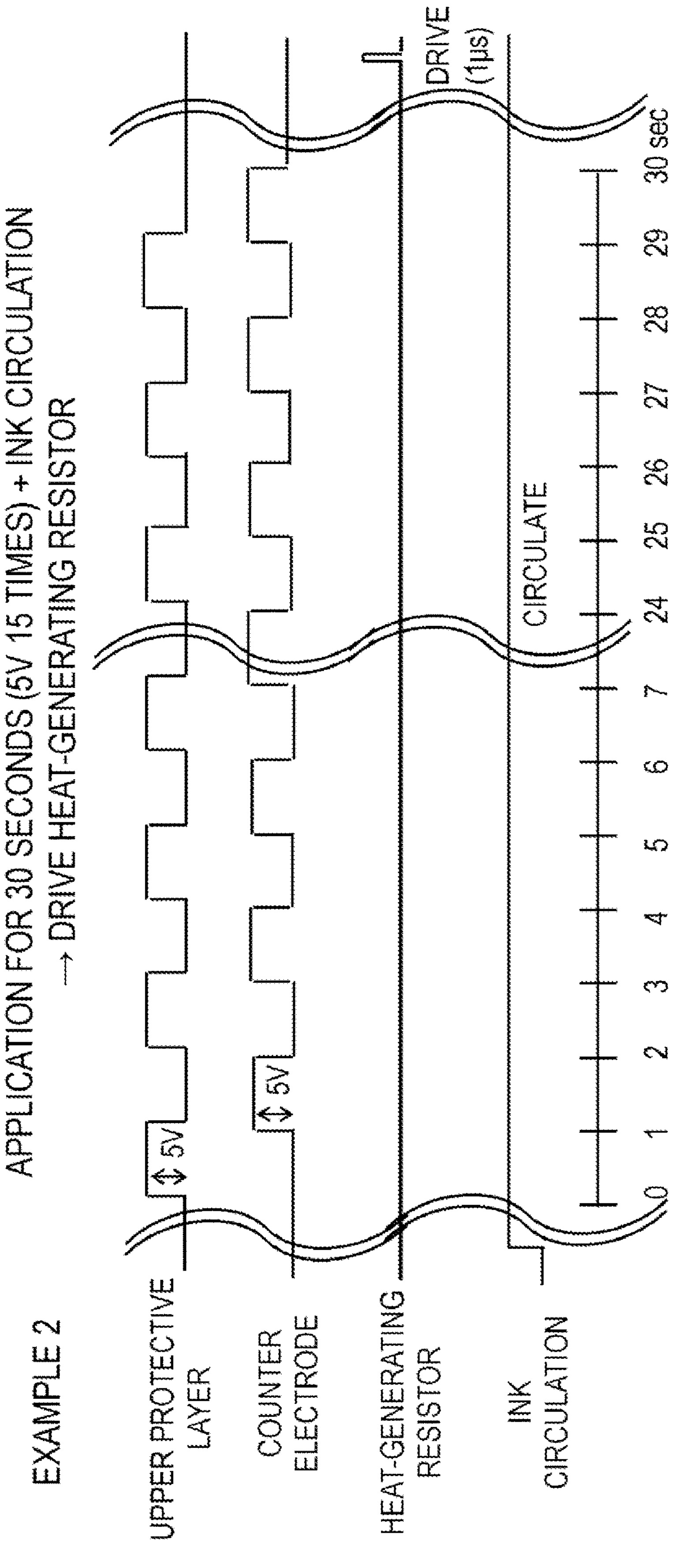
FIG. 12 is a timing chart of scorch-removal cleaning according to Example 2.

FIG. 12 shows a timing chart for scorch-removal cleaning according to Example 2. The scorch-removal cleaning according to Example 2 is the same as with Example 1 in that, after performing the first operation described above, the second operation described above was also performed, but these operations were performed while circulating ink within a nozzle liquid chamber. That is to say, the ink circulation control portion 44 serving as the liquid circulation unit operates a drive motor of a pump, and performs operations of supplying ink even when pulse voltage application to the heat-generating resistor 14 is not being performed. Accordingly, the ink is circulated in the order of the ink tank 31, the supply port 110, the channel 109, the recovery port 111, and the ink tank 31.

The first process of applying a voltage of 5 V with the upper protective layer 105 of the recording element board 10 as an anode and the counter electrode 17 thereof as a cathode, and the second process of applying voltage of 5 V with the upper protective layer 105 as a cathode and the counter electrode 17 as an anode, were alternated once a second each, which was repeated for a total of thirty seconds. In Example 2, this was carried out with ink circulation through the nozzle added thereto. Observation of the external appearance following application of voltage revealed that scorching on the upper protective layer 105 was not removed in the same way as with Example 1. However, no bubbles remained in the channel 109 due to effects of the circulation, and accordingly and there was no presence of residual bubbles completely covering the upper protective layer 105 or the electrode of the counter electrode 17. It was found that, by applying a pulse voltage several times to the heat-generating resistor 14 in this recording element board 10, scorching on the upper protective layer 105 could be removed by discharging ink several times. From these results, scorch removal in which residual bubbles can be suppressed more than in Example 1, and that is more stable, can be performed.

Example 3

Figure 13:
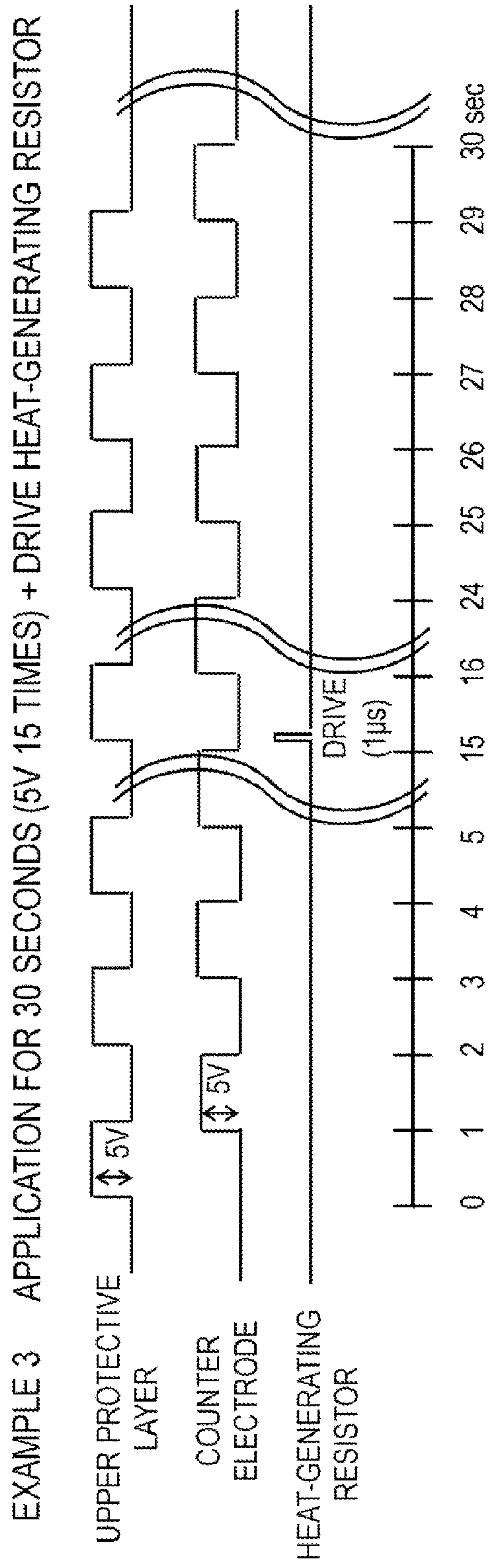
FIG. 13 is a timing chart of scorch-removal cleaning according to Example 3.

FIG. 13 shows a timing chart for scorch-removal cleaning according to Example 3. In the scorch-removal cleaning according to Example 3, the second operation described above was performed in the middle of the first operation described above.

The first process of applying a voltage of 5 V with the upper protective layer 105 of the recording element board 10 as an anode and the counter electrode 17 thereof as a cathode, and the second process of applying voltage of 5 V with the upper protective layer 105 as a cathode and the counter electrode 17 as an anode, were alternated once a second each, which was repeated for a total of thirty seconds. In Example 3, pulse voltage was applied to the heat-generating resistor 14 several times during the thirty seconds.

Observation of the external appearance thereafter revealed that the bubbles were in the same state as with Example 1, and that scorching on the upper protective layer 105 could be removed. From these results, it was confirmed that the same effects could be obtained by applying pulse voltage to the heat-generating resistor 14 before ending voltage application to the upper protective layer 105, i.e., by performing the second operation in the middle of the first operation.

Example 4

Figure 14:
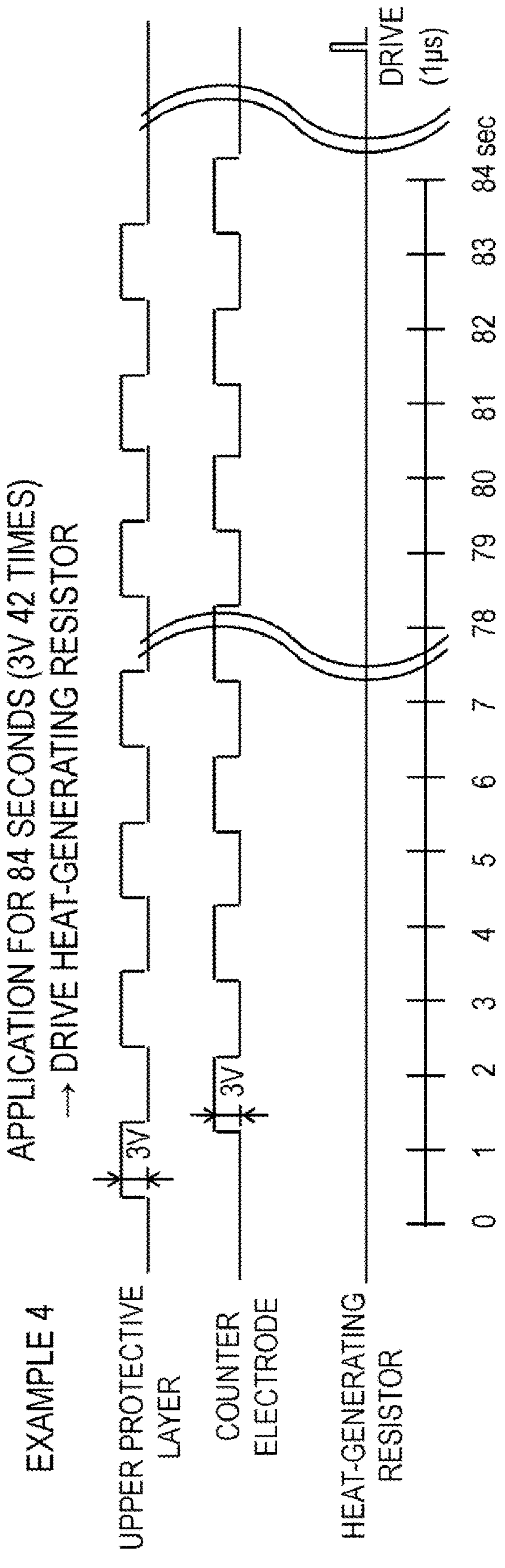
FIG. 14 is a timing chart of scorch-removal cleaning according to Example 4.

FIG. 14 shows a timing chart for scorch-removal cleaning according to Example 4. In the scorch-removal cleaning according to Example 4, the second operation described above was performed after performing the first operation described above, in the same way as Example 1. However, the number of times of repeating the first voltage application and the second voltage application was increased while reducing the magnitude of the applied voltage in comparison with Example 1.

The first process of applying a voltage of 3 V with the upper protective layer 105 of the recording element board 10 as an anode and the counter electrode 17 thereof as a cathode, and the second process of applying a voltage of 3 V with the upper protective layer 105 as a cathode and the counter electrode 17 as an anode, were alternated once a second each, which was repeated for eighty-four seconds. Observation of the external appearance following application of voltage revealed that scorching on the upper protective layer 105 was not removed, but hardly any bubbles were present in the channel 109, and there was no presence of residual bubbles completely covering the upper protective layer 105 or the electrode of the counter electrode 17. It was found that, by applying a pulse voltage several times to the heat-generating resistor 14 in this recording element board 10, scorching on the upper protective layer 105 could be removed by discharging ink several times.

Example 5

Figure 15:
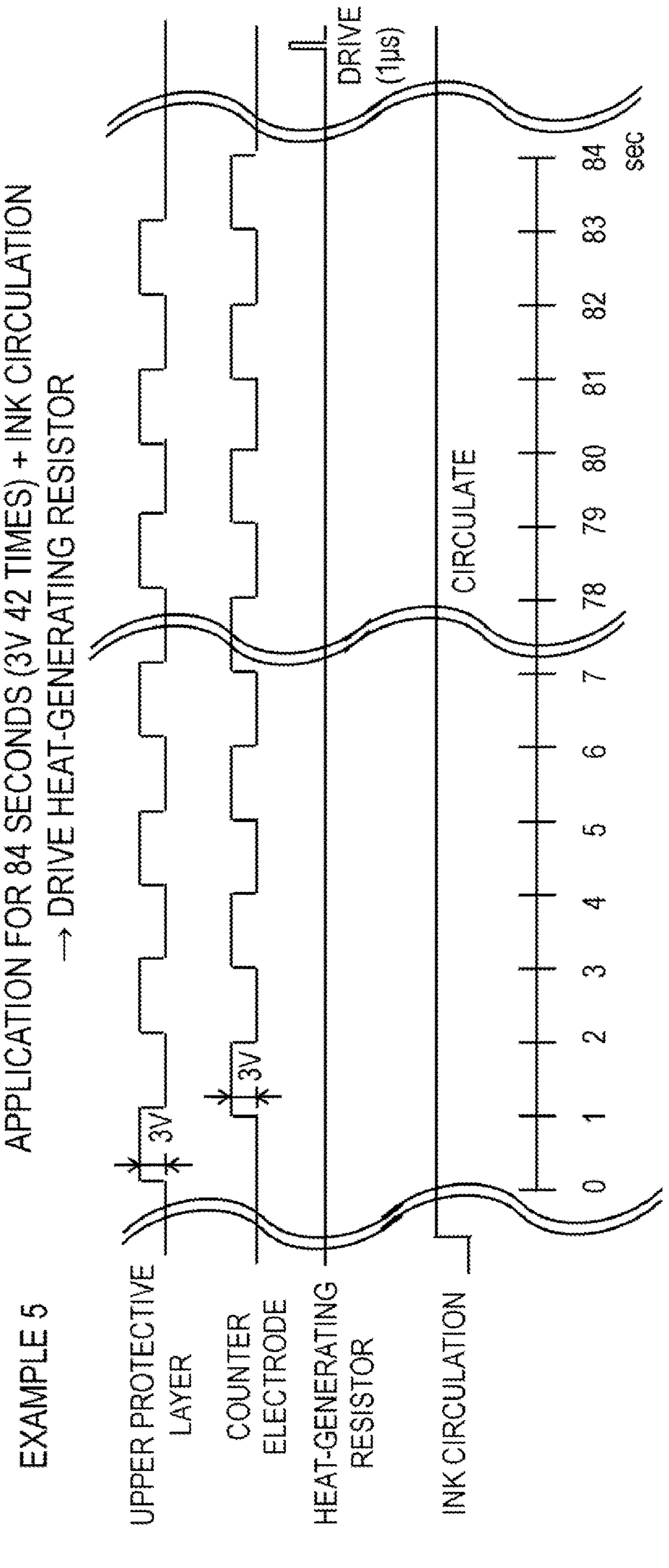
FIG. 15 is a timing chart of scorch-removal cleaning according to Example 5.

FIG. 15 shows a timing chart for scorch-removal cleaning according to Example 5. In the scorch-removal cleaning according to Example 5, operations the same as those of Example 4 are performed while circulating ink within the nozzle liquid chamber, in the same way as in Example 2.

The first process of applying a voltage of 3 V with the upper protective layer 105 of the recording element board 10 as an anode and the counter electrode 17 thereof as a cathode, and the second process of applying a voltage of 3 V with the upper protective layer 105 as a cathode and the counter electrode 17 as an anode, were alternated once a second each, which was repeated for eighty-four seconds. In Example 5, this was carried out with ink circulation through the nozzle added thereto. Observation of the external appearance following application of voltage revealed that scorching on the upper protective layer 105 was not removed. However, no bubbles remained due to the effects of the circulation, and accordingly and there was no presence of residual bubbles completely covering the upper protective layer 105 or the electrode of the counter electrode 17. It was found that by applying a pulse voltage several times to the heat-generating resistor 14 in this recording element board 10, scorching on the upper protective layer 105 could be removed by discharging ink several times.

Note that, in all of the Examples, ink discharge as the second operation may double as actual discharge onto a paper sheet, or the like. Alternatively, this may double as preliminary discharging in a state in which a cap is attached to the nozzles into which the discharge orifices 13 open (discharging for refreshing the insides of the nozzles). Also, it is known that the same effects can also be obtained with nucleate boiling of ink, in which discharge energy is subdued, instead of film boiling that enables ink discharge. The results are compiled in Table 1.

[Table 1]

TABLE 1

| | Upper protective layer voltage application conditions | After voltage application to upper protective layer Residual bubbles in channel | Bubbles covering electrode | Remaining scorching | After ink discharge Remaining scorching |
|---|---|---|---|---|---|
| Comparative Example 1 | 10 V, 8 seconds | Extremely great number present | Present | Present | Present Note: Incapable of discharge due to residual bubbles |
| Example 1 | 5 V, 30 seconds | Slight number present | None | Present | None |
| Example 2 | 5 V, 30 seconds With ink circulation | None | None | Present | None |
| Example 3 | 5 V, 30 seconds | Slight number present | None | None Note: Ink discharged during voltage application | |
| Example 4 | 3 V, 84 seconds | Almost none | None | Present | None |
| Example 5 | 3 V, 84 seconds With ink circulation | None | None | Present | None |

The configurations of each of the above Examples can be combined with each other.

The present disclosure enables scorch-removal cleaning to be performed that is more stable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid discharge apparatus comprising:

a liquid chamber that has a discharge orifice for a liquid;

a liquid discharge unit including:

a heat-generating resistor for imparting discharge energy to a liquid in the liquid chamber;

a first electrode that is provided in the liquid chamber so as to cover the heat-generating resistor; and a second electrode that is provided at a different position from the first electrode in the liquid chamber;

a first voltage application unit capable of applying a voltage to the heat-generating resistor;

a second voltage application unit capable of applying a voltage between the first electrode and the second electrode; and a control portion that controls the first voltage application unit and the second voltage application unit, wherein the control portion performs, as operations to remove an adhered substance on the first electrode, a first operation that is a voltage application by the second voltage application unit between the first electrode and the second electrode, in which a first voltage application where the first electrode is an anode and a second voltage application where the first electrode is a cathode are alternatingly repeated, in order to partially dislodge the adhered substance, and a second operation that is a voltage application by the first voltage application unit to the heat-generating resistor, the second operation being an operation for separating the adhered substance from the first electrode by applying a discharge energy thereto, in order to remove the adhered substance.

2. The liquid discharge apparatus according to claim 1, wherein the second operation is performed after the first operation.

3. The liquid discharge apparatus according to claim 1, wherein the second operation is performed in the middle of the first operation.

4. The liquid discharge apparatus according to claim 1, further comprising a circulation unit for circulating the liquid in the liquid chamber, wherein the first operation and the second operation are performed as the circulation unit circulates the liquid in the liquid chamber.

5. The liquid discharge apparatus according to claim 1, wherein the voltage that the first voltage application unit applies to the heat-generating resistor in the second operation is pulse voltage.

6. The liquid discharge apparatus according to claim 5, wherein the pulse voltage is applied a plurality of times.

7. The liquid discharge apparatus according to claim 1, wherein the first operation is an operation for reducing an adherence area of the adhered substance on the first electrode.

8. The liquid discharge apparatus according to claim 7, wherein, in the first operation, the first voltage application and the second voltage application are performed at a magnitude of voltage that causes elution of the first electrode into the liquid, but not enough to cause the adhered substance to separate from the first electrode.

9. The liquid discharge apparatus according to claim 7, wherein, in the first operation, the first voltage application and the second voltage application are performed for a count of times that causes elution of the first electrode into the liquid, but not enough to cause the adhered substance to separate from the first electrode.

10. The liquid discharge apparatus according to claim 1, wherein the voltage that the first voltage application unit applies to the heat-generating resistor in the second operation is of a magnitude to cause film-boiling of ink serving as the liquid.

11. The liquid discharge apparatus according to claim 1, wherein the second operation is also an operation for discharging liquid to a recording medium.

12. The liquid discharge apparatus according to claim 1, wherein the second operation is also an operation for preliminary discharging liquid.

13. The liquid discharge apparatus according to claim 1, wherein the second operation is also an operation for discharging liquid in a state in which a cap is attached to a nozzle into which the discharge orifice opens.

14. The liquid discharge apparatus according to claim 1, wherein—the first electrode is made of a material including iridium, ruthenium, or platinum.

15. A cleaning method for cleaning a liquid discharge apparatus that includes a liquid chamber that has a discharge orifice for a liquid, a liquid discharge unit including a heat-generating resistor for imparting discharge energy to a liquid in the liquid chamber, a first electrode that is provided in the liquid chamber so as to cover the heat-generating resistor, and a second electrode that is provided at a different position from the first electrode in the liquid chamber, a first voltage application unit capable of applying a voltage to the heat-generating resistor, and a second voltage application unit capable of applying a voltage across the first electrode and the second electrode, the cleaning method comprising:

performing operations for removing an adhered substance on the first electrode by:

performing a first operation that is a voltage application by the second voltage application unit between the first electrode and the second electrode, in which a first voltage application where the first electrode is an anode and a second voltage application where the first electrode is a cathode are alternatingly repeated, in order to partially dislodge the adhered substance; and performing a second operation that is a voltage application by the first voltage application unit to the heat-generating resistor, the second operation being an operation for separating the adhered substance from the first electrode by applying a discharge energy thereto, in order to remove the adhered substance.

16. The liquid discharge apparatus according to claim 1, wherein the adhered substance is scorching.

17. The cleaning method for cleaning a liquid discharge apparatus according to claim 15, wherein the first operation is an operation to reduce an adherence area of the adhered substance on the first electrode.

18. The cleaning method for cleaning a liquid discharge apparatus according to claim 15, wherein the adhered substance is scorching.

* * * * *